(12) United States Patent
Vasseur et al.

(10) Patent No.: US 7,471,636 B2
(45) Date of Patent: Dec. 30, 2008

(54) METHODS AND APPARATUS BASED ON MESSAGE TRANSMISSION TIMES

(75) Inventors: Jean-Philippe Vasseur, Dunstable, MA (US); Stefano Previdi, Rome (IT); James N. Guichard, Groton, MA (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 11/063,803

(22) Filed: Feb. 23, 2005

(65) Prior Publication Data

US 2006/0187916 A1   Aug. 24, 2006

(51) Int. Cl.
*H04L 12/26* (2006.01)
(52) U.S. Cl. ...................... 370/242; 370/252
(58) Field of Classification Search .................. None
See application file for complete search history.

(56) References Cited

U.S. PATENT DOCUMENTS

| | | | | |
|---|---|---|---|---|
| 5,142,531 | A * | 8/1992 | Kirby | 370/254 |
| 5,563,875 | A * | 10/1996 | Hefel et al. | 370/249 |
| 6,026,077 | A * | 2/2000 | Iwata | 370/254 |
| 6,928,473 | B1 * | 8/2005 | Sundaram et al. | 709/224 |
| 7,035,202 | B2 * | 4/2006 | Callon | 370/216 |
| 7,154,858 | B1 * | 12/2006 | Zhang et al. | 370/252 |
| 7,336,615 | B1 * | 2/2008 | Pan et al. | 370/248 |
| 2004/0213167 | A1 * | 10/2004 | Garcia-Luna-Aceves et al. | 370/254 |
| 2004/0246911 | A1 * | 12/2004 | Bonsma et al. | 370/254 |
| 2005/0078610 | A1 * | 4/2005 | Previdi et al. | 370/254 |
| 2005/0111418 | A1 * | 5/2005 | Yang et al. | 370/338 |
| 2006/0007863 | A1 * | 1/2006 | Naghian | 370/238 |

\* cited by examiner

*Primary Examiner*—Edan Orgad
*Assistant Examiner*—Timothy J Weidner
(74) *Attorney, Agent, or Firm*—Brinks Hofer Gilson & Lione

(57) ABSTRACT

A data communication device (e.g., a router) originates a network configuration message in response to a network topology change or so as to refresh a configuration message. The data communication device encodes a timestamp in the network configuration message. The timestamp indicates a time of originating the network configuration message. Further, the data communication device transmits the network configuration message over the network to other network devices that, in turn, initiate further broadcast of at least a portion of contents of the network configuration message. Based on the timestamp of the network configuration message, the data communication devices receiving the network configuration message identify transmission time value indicating how long the network configuration message takes to be conveyed over the network to the other network devices. The data communication devices utilize the transmission time value as a timeout period for determining whether a data communication device failure occurs.

26 Claims, 7 Drawing Sheets

METHODS AND APPARATUS BASED ON MESSAGE TRANSMISSION TIMES

BACKGROUND

Computer networks typically provide physical interconnections between different computers to allow for the convenient exchange of programs and data. For example, a network typically includes a plurality of connectivity devices, such as switches and routers, interconnecting each user computer connected to such a network. In general, the connectivity devices maintain routing information about the computers and other connectivity devices, and perform routing decisions concerning message traffic passed between the computers.

Each connectivity device, or router, corresponds to a network routing prefix (prefix) indicative of the other computers to which it has direct or indirect access. Therefore, data routed from one computer to another can follow a path through the network defined by the routers between the two computers. In this manner, the aggregation of routers in the network defines a set of interconnections between the various computers connected to the network.

In terms of a topological representation, therefore, such a network may be conceived as an interconnection of multiple computer nodes. Such a representation defines one or more paths between each of the computers connected to the network. The routers, therefore, define nodes in a network, and data travels between the nodes in a series of so-called "hops" over the network. Since each router is typically connected to multiple other routers, there may be multiple potential alternative paths and hops between given computers.

Typically, routing information is employed in a routing table in each router node. A router node uses the routing table to determine a path to a destination computer or another network. For example, the router makes a routing decision, using the routing table, to identify a next "hop," or next router, to send the data in order for the data such as a network data packet to ultimately reach the destination computer. However, network failures may occur in router nodes and links between the routers. In such a case, one computer coupled to communicate over the network may not be able to communicate with another computer coupled to communicate over the network at least for some period of time.

In many network applications, it is quite useful to know the time it takes to transmit messages or data packets to different nodes in a network. At a minimum, such a metric reflects the efficiency of the network. For example, a measurement of relatively low transmission times to convey messages from one network node to another network node likely indicates that a network is operating more efficiently compared to other occasion when alternative measurements indicate relatively high transmission times to convey messages.

One conventional method of determining message transit times is to precisely calculate such message transit times based on parameters such as queue delays, hop delays, path efficiency, network topology, etc. That is, one may add up all of the possible delays between the network nodes and links to identify network message transit times.

SUMMARY

Conventional techniques of identifying network message transit times can suffer from a number of deficiencies. For example, generating a timeout value based on a precise calculation of many potential sources of delays between network nodes can be a tedious and time-consuming task. At a minimum, such a task requires maintaining statistical delay information associated with many delay sources, retrieving the delay information, and determining probable paths through the network to identify pertinent delay sources. Network configurations can change quite often. Consequently, it can be difficult to ascertain what paths communication messages shall travel from one node of a network to another and, therefore, how long the network will take to convey a message from a first network node to a second network node.

In contradistinction to the techniques discussed above as well as additional techniques known in the prior art, embodiments discussed herein include advantageous mechanisms and techniques for accurately estimating parameters such as worst-case times required to convey messages over a network. Such information can be useful in certain network applications. For example, one possible application of the present invention is to enable a router to determine the maximum amount of time it takes to learn of the occurrence of a potential network failure, which equals a maximum amount of time to receive a Link State Advertisement (LSA) message. As a sample illustration, an application at first network node may rely on receipt of messages from a second network node in which, if a message or information is not received at first node within timeout value T, the first network node triggers a specific action. According to one aspect of the invention, one can set time value T to the maximum time required to receive an LSA message.

More particularly, in one embodiment, multiple routers in a network synchronize their corresponding time clocks amongst themselves based on use of a synchronizing protocol such as NTP (Network Time Protocol). The routers flood the network with network configuration messages such as those based on the LSA/LSP to advertise status information of a network configuration change to other routers. When originating a respective network configuration message, a respective router generates a timestamp based on use of its synchronized clock for inclusion in a field of the network configuration message. Other routers receiving the network configuration message identify a travel time (or flooding time) associated with the network configuration message over the network by comparing a timestamp (e.g., origination time) of a received network configuration message to their own time clock (e.g., the receiving router's time clock) to calculate a transmission time value indicating how long the network configuration message took to be conveyed over the network from the originator router (that puts the timestamp in the network configuration message) to a corresponding receiving router (that compares the timestamp to its clock). The routers in the network each maintain a table tracking a router identifier of other routers in the network as well as a corresponding time calculation identifying how long it takes for respective messages to be conveyed over the network from the other routers to the given router storing a respective table. Consequently, each router tracks how long it should take to receive a message from the other routers in the network based on entries in tables of the respective routers.

Now, from a more general perspective, one technique discussed herein involves a data communication device (e.g., a router) originating a network configuration message in response to a network topology change. The data communication device, as mentioned, provides a time value in the network configuration message. The time value indicates a time of originating the network configuration message. Further, the data communication device transmits the network configuration message over the network to other network devices (e.g., other routers) that, in turn, initiate the advertisement of at least a portion of contents of the network configuration message to yet other network devices to advertise the network topology change. Consequently, via the network configuration message and corresponding time value in a data field of an LSA/LSP (Link State Advertisement/Link State Packet) message, the data communication devices flood the network with advertisements of network topology changes as well as provide time reference values for the other network devices to measure transmission time values indicating how long the network configuration message takes to be conveyed over the network to the other network devices. The other network devices utilizing the transmission time values as a timeout period for determining whether a communication failure occurs in the network.

As briefly discussed above, from a perspective of a data communication device on a receiving end of the network configuration message, another technique herein involves tracking an ability of a network to convey messages. For example, a data communication device such as a router processes the network configuration message to identify when an originator data communication device of the network configuration message initiated transmission of the network configuration message over the network. As discussed, based on when the originator initiated transmission of the network configuration message and its timestamp, the receiving data communication device calculates a transmission time value measuring how long the network configuration message takes to be conveyed over the network from the originator to the receiving data communication device.

Note that techniques herein are well suited for use in applications such as tracking an ability to communicate messages over a network, appending timestamps to network configuration messages, generating communication timeout values, troubleshooting, etc. However, it should be noted that configurations herein are not limited to use in such applications and thus configurations herein and deviations thereof are well suited for other applications as well.

Other examples of the present application include a computerized device (e.g., a host computer, workstation, etc.) configured to support the aforementioned method operations disclosed herein as embodiments of the present application to facilitate generation of communication timeout values. In such embodiments, the computerized device such as a management control center includes a memory system, a processor (e.g., a processing device), a display, and an interconnect. The interconnect supports communications among the display, the processor, and the memory system. The memory system is encoded with an application that, when executed on the processor, produces a process to track a time for transmitting messages through a network.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to track times to convey messages through a network as explained herein. The computer program logic, when executed on at least one processor with a computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One particular embodiment of the present application is directed to a computer program product that includes a computer readable medium having instructions stored thereon for supporting management of network resources. The instructions, when carried out by a processor of a respective computer device, cause the processor to perform the steps of: i) receiving a network configuration message transmitted over the network; ii) processing the network configuration message to identify when an originator of the network configuration message initiated transmission of the network configuration message over the network; and iii) based on when the originator initiated transmission of the network configuration message, calculating a transmission time value measuring how long the network configuration message takes to be conveyed over the network from the originator to the data communication device. Other embodiments of the present application include software programs to perform any of the method embodiment steps and operations summarized above and disclosed in detail below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

One technique of the present application is directed to determining an amount of time it takes to learn of a potential network failure, which equals a maximum estimated time to receive an LSA message.

More specifically, from a system perspective, multiple routers in a network synchronize their respective time clocks based on use of a synchronizing protocol such as NTP (Network Time Protocol). The routers (periodically or in response to a network reconfiguration) advertise the network configuration messages such as those based on the LSA/LSP to send status information of a potential network configuration change to other routers. When originating a respective network configuration message, a respective router generates a timestamp based on use of its own synchronized clock. For instance, the router includes the generated timestamp in a field of the network configuration message. Other routers generate similar types of messages including respective timestamps when the other routers originate or generate the network configuration messages. In one implementation, not every LSA message generated by a router includes a timestamp.

Each router receiving a respective network configuration message identifies a travel time (or flooding time) associated with the network configuration message by comparing a respective timestamp (e.g., origination time) of the network configuration message to its own respective time clock (e.g., the receiving router's time clock) to calculate a transmission time value indicating how long the network configuration message took to be conveyed over the network from the originator router to a corresponding receiving router.

The routers in the network each maintain a table tracking a router identifier of other routers in the network as well a corresponding estimated time value identifying how long it takes for respective messages to be conveyed over the network from the other routers to the given router storing a respective table. Consequently, each router tracks an estimate of how long it should take to receive LSA messages from each of the other routers in the network based on entries in its table.

Figure 1:
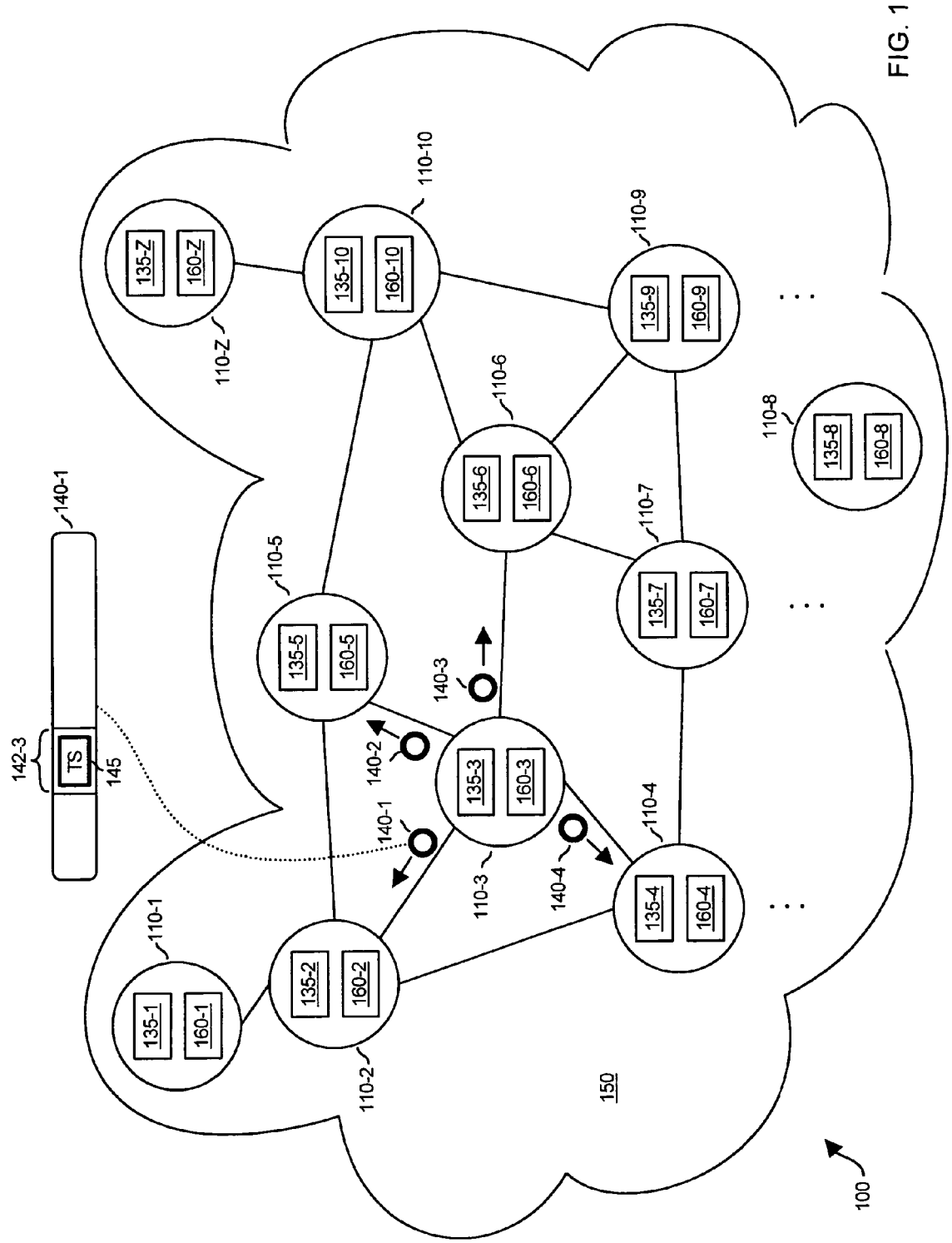
FIG. 1 is a block diagram of a communication system in which data communication devices such as routers track an ability to transmit messages over a network.

FIG. 1 is a block diagram of a communication system 100 in which data communication devices 110 such as routers track an ability to transmit messages over a network 150. As shown, communication system 100 includes network 150 including data communication devices 110 (e.g., data communication device 110-1, data communication device 110-2, data communication device 110-3, . . . , data communication device 110-z). Each data communication device 110 includes a respective clock 135 for tacking system time. Clocks 135 are synchronized amongst each other via utilization of NTP (Network Time Protocol) such as version 3 as discussed in Request For Comment 1305. Each data communication device 110 also maintains a respective table 160 for storing statistical information of transmitted messages 140. Thus, in the context shown in FIG. 1, data communication device 110-1 maintains respective table 160-1 and respective clock 135-1, data communication device 110-2 maintains respective table 160-2 and respective clock 135-2, and so on.

Data communication device 110-1, data communication device 110-2, . . . , and data communication device 110-n support communications (e.g., TCP/IP communications) in network 150. The data communication devices 110 communicate with each other to learn their respective adjacent neighbors. After determining adjacencies, the data communication devices 110 perform link state flooding via transmission of messages 140. A suitable routing protocol message such as LSA/LSP (Link State Advertisement/Label Switched Path) can be used to communicate routing information amongst data communication devices 110.

In the context of such an application in which data communication devices communicate information via LSA messages (e.g., messages 140), after establishing adjacencies, data communication devices 110 originate and transmit messages 140 (e.g., network configuration messages 140). For example, data communication device 110-3 originates and transmits message 140-1 to data communication device 110-2. Data communication device 110-2 also originates and transmits message 140-2 to data communication device 110-5, message 140-3 to data communication device 110-6, and message 140-4 to data communication device 110-4. In one application, messages 140-1, 140-2, 140-3, and 140-4 are identical. As the term "flooding" implies, data communication devices 110 advertise information to their respective neighbors. In turn, a respective data communication device 110 receives the respective message 140. The receiving data communication device 110 then copies the message 140 and forwards it to their respective neighbors so as not to duplicate transmission of message 140 to a data communication device 110 that already received the message 140. For example, in the example network 150 shown, data communication device 110-6 copies and forwards the message 140 to data communication device 110-7, data communication device 110-9, and data communication device 110-10. This technique of broadcasting message 140 enables faster convergence (e.g., process of updating routing tables to be consistent) in network 150 after a network configuration topology change such as when neighbor data communication devices update their routing tables due to a failure or requested change to the routing tables. The process of broadcasting messages to neighbors in the network 150 continues until all data communication devices 110 are informed of a change.

When transmitting messages 140, data communication device 110-3 provides an indication of the time of originating such messages 140. For example, data communication device 110-3 generates a timestamp 145 based on its corresponding clock 135-3 at a time of originating message 140-1. The data communication device 110-3 then encodes the timestamp 145 in a respective data field 142-3 of message 140-1. The data communication device 110-3 repeats this process of encoding a timestamp value at a time of originating or generating messages 140 for other messages such as message 140-2, message 140-3, and message 140-4.

On an incoming side, data communication devices 110 receiving respective messages 140 from data communication device 110-3 perform multiple functions. For example, data communication device 110-2 receives message 140-1 from data communication device 110-3. Upon receipt, data communication device 110-2 compares the timestamp 145 encoded in data field 142-3 of message 140-1 with a time of its own respective clock 160-2. Since the clocks 160 are synchronized as discussed above, the data communication device 110-2 can determine how long it took to convey the message 140-1 over network 150 and be received by data communication device 110-2. Data communication device 110-2 stores this time value in its respective table 160-2. Additionally, data communication device 110-2 copies contents of the message and forwards the time stamp 145 and identification of the originator of message 140-1 (e.g., data communication device 110-3) on to data communication device 110-1. Upon receipt, data communication device 110-1 repeats the process to identify how long the original message 140-1 takes to be conveyed over network 150 to data communication device 110-1. Since each of the data communication devices 110 in network 150 can originate similar types of messages, processing and propagation of the messages through network 150 enables the data communication devices 110 to track transit times associated with messages transmitted through network 150.

Figure 2:
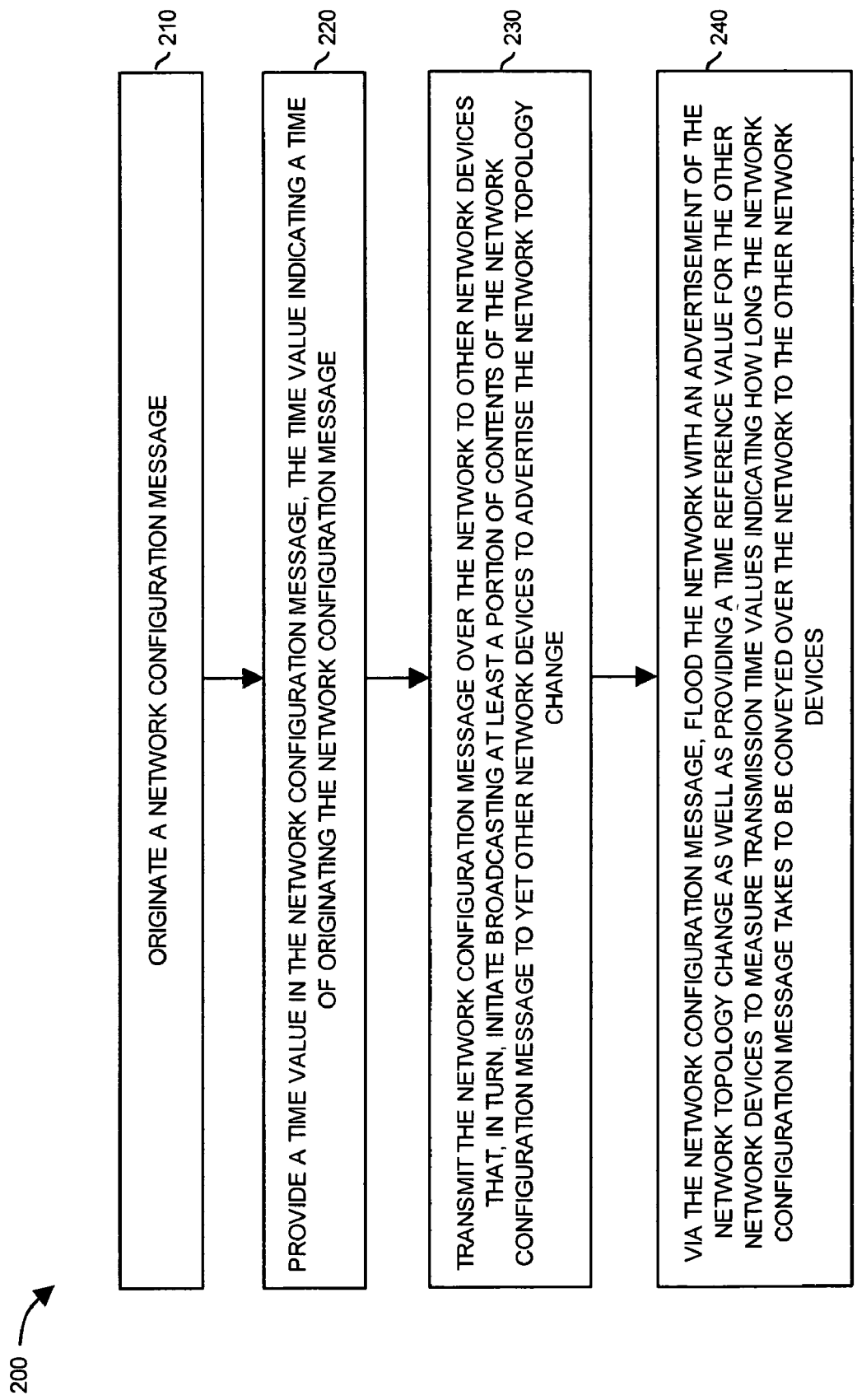
FIG. 2 is a flowchart illustrating a technique of inserting timestamps in transmitted messages for other routers to track a relative transit time of the messages.
Figure 3:
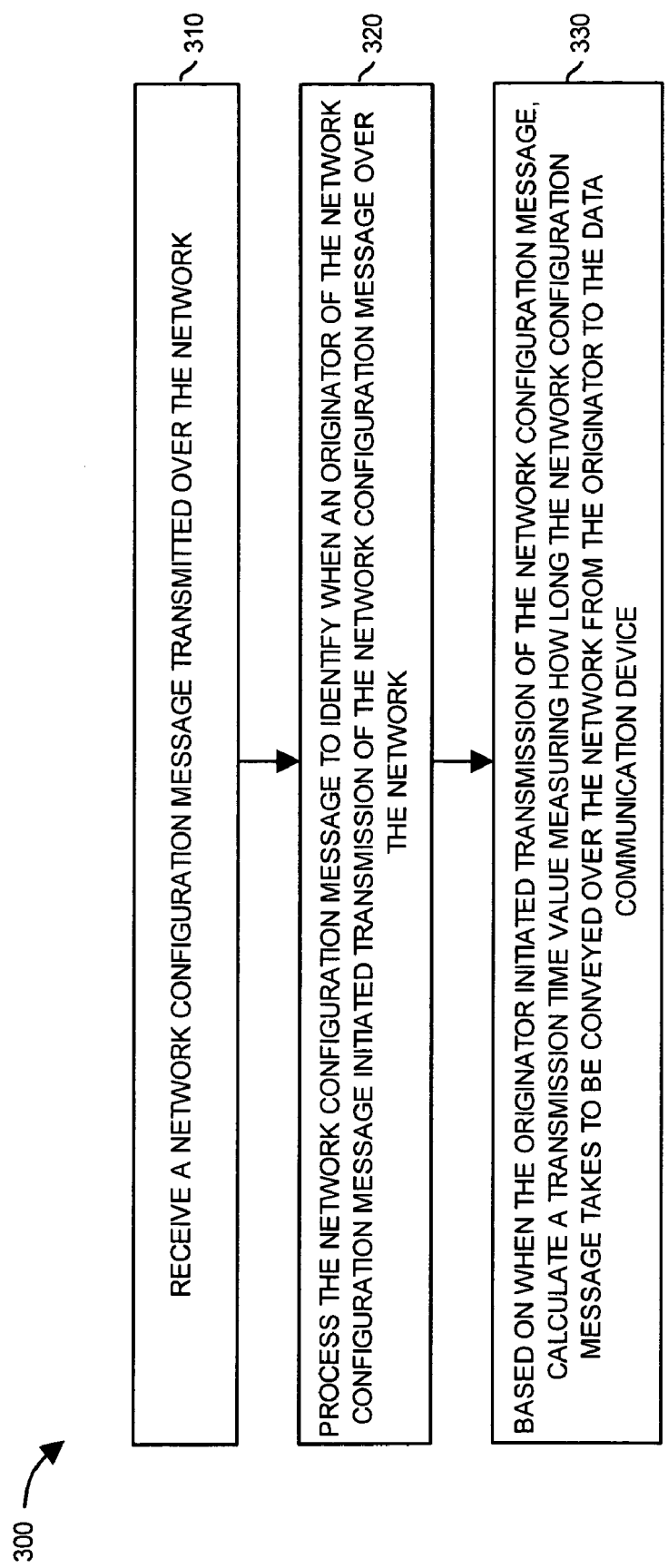
FIG. 3 is a diagram of a table illustrating an example technique of, at a given router in a network, tracking transit times of messages received from other routers.

FIGS. 2 and 3 are flowcharts capturing the above techniques of encoding a timestamp 140 in a network message and processing of same to track transit times.

For example, FIG. 2 is a flowchart 200 illustrating a technique of inserting a timestamp 145 in transmitted messages 140 as discussed above. One purpose of the timestamp 145 is to track a relative transit time of the messages 140 through network 150.

In step 210, data communication device 110-3 originates a network configuration message 140-1 such as an LSA message.

In step 220, data communication device 110-3 provides a time value (e.g., timestamp 145) in the message 140-1 (e.g., network configuration message). As mentioned, the time stamp indicates a time of when the data communication device 110-3 originates the message 140-1.

In step 230, the data communication device 110-3 transmits the message 140-1 over the network 150 to other network devices (e.g., data communication devices 110) that, in turn, initiate broadcasting at least a portion of contents of the network configuration message to yet other network devices to advertise potential network topology change(s).

In step 240, via the messages 140, data communication device 110-3 can initiate flooding the network 150 with an advertisement of a potential network topology change as well as provides a time reference value for the other network devices (e.g., data communication devices 110) to measure transmission time values indicating how long the messages 140 takes to be conveyed over the network 150.

Note that although the above discussion pertains to a specific data communication device such as data communication device 110-3, each of the data communication devices 110 of system 100 can operate in a similar way to initiate flooding of the network 150 with time-stamped messages.

FIG. 3 is a flowchart 300 illustrating a technique for identifying transit times of messages transmitted through network 150 for each of multiple data communication devices 110 such as routers. Flowchart 300 illustrates how data communication device 110-2 processes received messages. Note that other data communication devices 110 support similar message processing.

In step 310, data communication device 110-2 receives message 140-1 transmitted over the network 150 from data communication device 110-3.

In step 320, data communication device 110 processes the message 140-1 to identify when an originator of the network configuration message initiated transmission of the network configuration message over the network. For example, data communication device 110-2 retrieves timestamp 145 from message 140-1 to learn a time originating (e.g., transmitting) messages 140.

In step 330, based on when the data communication device 110-3 (e.g., the originator) initiated transmission of the message 140-1, data communication device 110-2 calculates a transmission time value measuring how long the message 140-1 takes to be conveyed over the network 150 from the originator to the data communication device. In one embodiment, data communication device calculates this time based on a time difference between the time stamp 145 of the message 140-1 and clock 135-2 of data communication device 110-2. In addition to retrieving an encoded binary value such as a timestamp 145 stored in a network configuration message, a receiving data communication device 110-2 can parse the received message (e.g., a link state advertisement message) to identify state information of router interfaces associated with the other data communication devices 110 as well as a state information of neighboring data communication devices 110 of a message originator.

Figure 4:
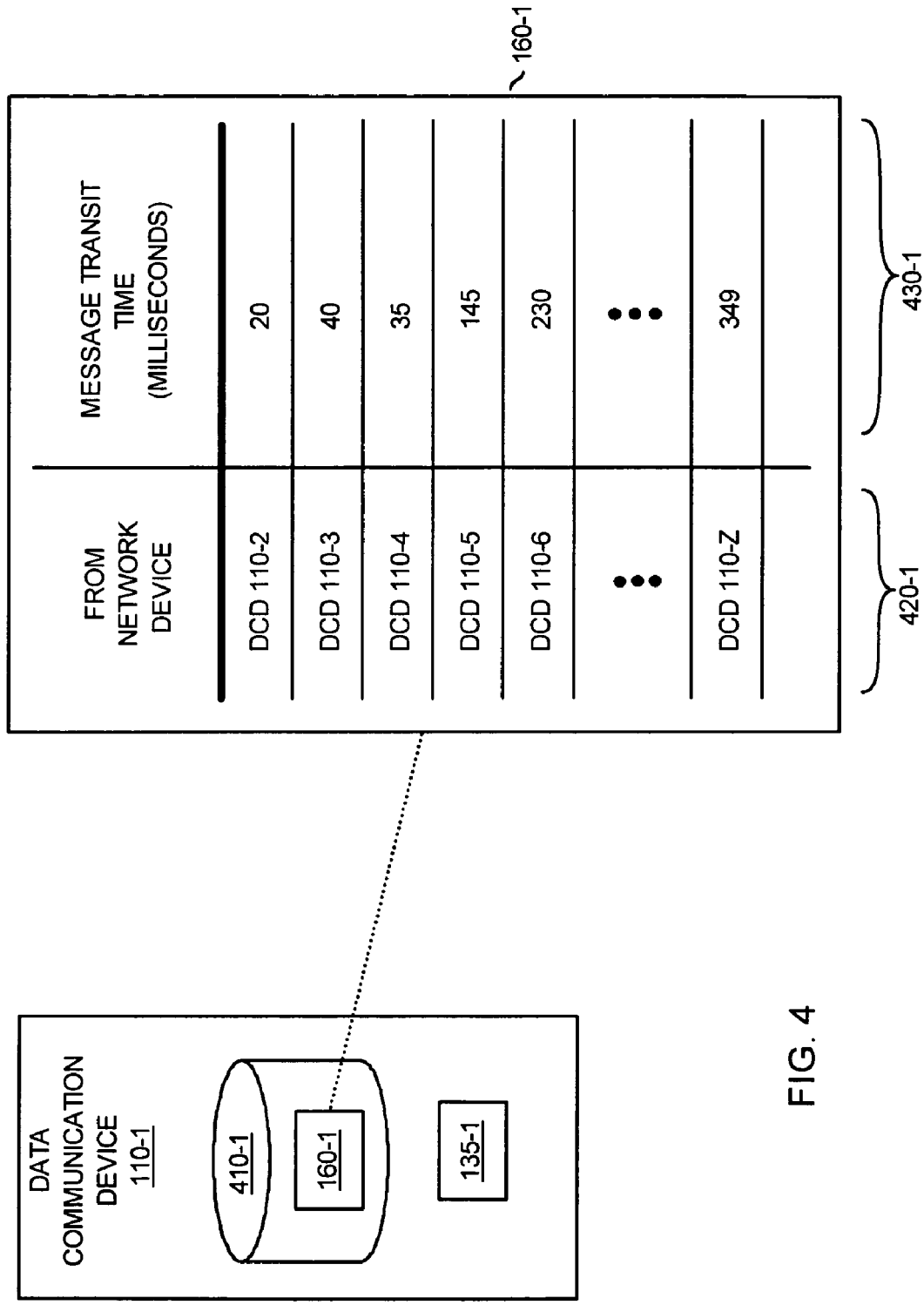
FIG. 4 is a diagram of a table illustrating an example technique of, at a given router in a network, tracking transit times of messages received from other routers.

FIG. 4 is a diagram of data communication device 110-1 including a first embodiment of table 160-1 for tracking transit (e.g., conveyance) times of messages received from other data communication devices 110. More specifically, data communication device 110-1 includes table 160-1 stored in a respective repository 160-1. Column 420-1 of table 160-1 includes a list of identifiers of other data communication devices 110 in network 150 that have generated LSA messages and initiated broadcast of the LSA messages through network 150. Column 430-1 in table 160-1 includes a list of transit times associated with messages transmitted from other data communication devices 110 in network 150 to data communication device 110-1. Thus, each entry in column 420-1 identifies a respective data communication device 110 while a corresponding entry in column 430-1 identifies a transit time associated with messages received from the respective data communication device 110.

In one application, the data communication device 110-1 filters out anomalies or unusually long transit time values associated with messages received over network 150. For example, based on a comparison algorithm, the data communication device 110-1 can identify whether a transmission time value for a newly received network message is substantially different than transmission time values of previous messages received from the same originator (e.g., data communication device). If so, the data communication device 110-1 filters out an assumed anomaly by not updating the worst-case transmission time entry in the table 160-1 for the originator data communication device because, in doing so, the data communication device 110-1 would produce an erroneous time value for conveyed messages.

In another application, an estimated worst-case transit time for messages from a data communication device is the 95 percentile value of identified transit times for a corresponding router so as to eliminate any pathological cases of abnormally high transit time values. Thus, according to one implementation, a data communication device calculating the transit time values may remove a percentage of the highest identified transit time values (or filter out transit time values being over a present worst case transit time value by a certain percentage) for messages received from a given data communication device to estimate a worst case transit time value for storage in table 160-1.

Note that in one application, a time value stored in an entry of column 430-1 is a weighted average for a series of messages received form a respective data communication device. In another application, the time value stored in an entry of column 430-1 represents a highest transit time detected for a corresponding originator data communication device 110 with an occasional anomaly transit time thrown out.

Figure 5:
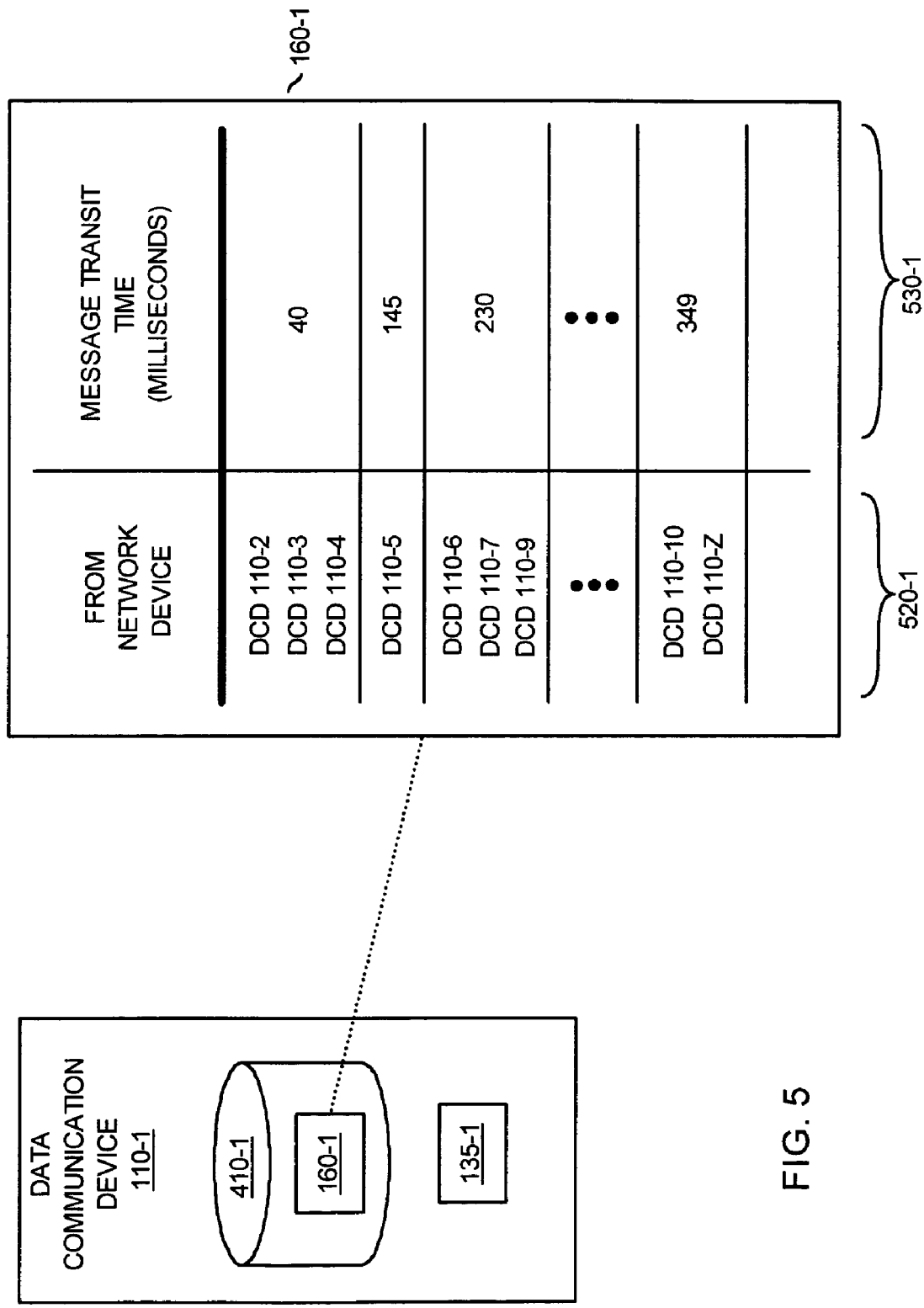
FIG. 5 is a flowchart illustrating a technique for identifying transit times of messages transmitted through a network for each of multiple routers.

FIG. 5 is a diagram of data communication device 110-1 including a second embodiment of table 160-1 for tracking transit times of messages received from other data communication devices 110. As shown, this second embodiment of table 160-1 is similar to the table 160-1 shown in FIG. 4. However, the table 160-1 in FIG. 5 includes fewer entries due to implementation of a consolidation technique. Such a technique includes storing a single transit time value for a grouping of data communication devices in network 150. Thus, in this second embodiment, data communication device 110-1 saves on memory usage because there are fewer entries in the table 160-1.

In addition to transit time, local processing time of an LSA/LSP message can be added to this maximum amount of time to estimate a worst-case time value for a given data communication device 110.

Preferably, a single transit time value stored for a group of data communication devices 110 is an estimated worst case of any member of the group of data communication devices 110 that it represents. For example, in one application, a data communication device 110 identifies a grouping based on knowledge of a topology of network 150. Based on such a topology, data communication device 110-1 can identify which of the other data communication devices in network 150 (either near or far away from a data communication device 110 maintaining a respective table 160-1) are close to each other and that have approximately the same transit times to convey a message to the data communication device 110-1. The data communication device 110-1 maintains a transit time as a highest transit time of any particular member of a group. Thus, in lieu of storing an entry in the table for each of multiple network devices in a network 150, the data communication device maintains an estimated single worst-case transmission time value for a group of network devices. If desired, weighted averaging techniques and dropping of anomaly transmit values for members of a group can be implemented as discussed above for the second embodiment of table 160-1 as well.

Figure 6:
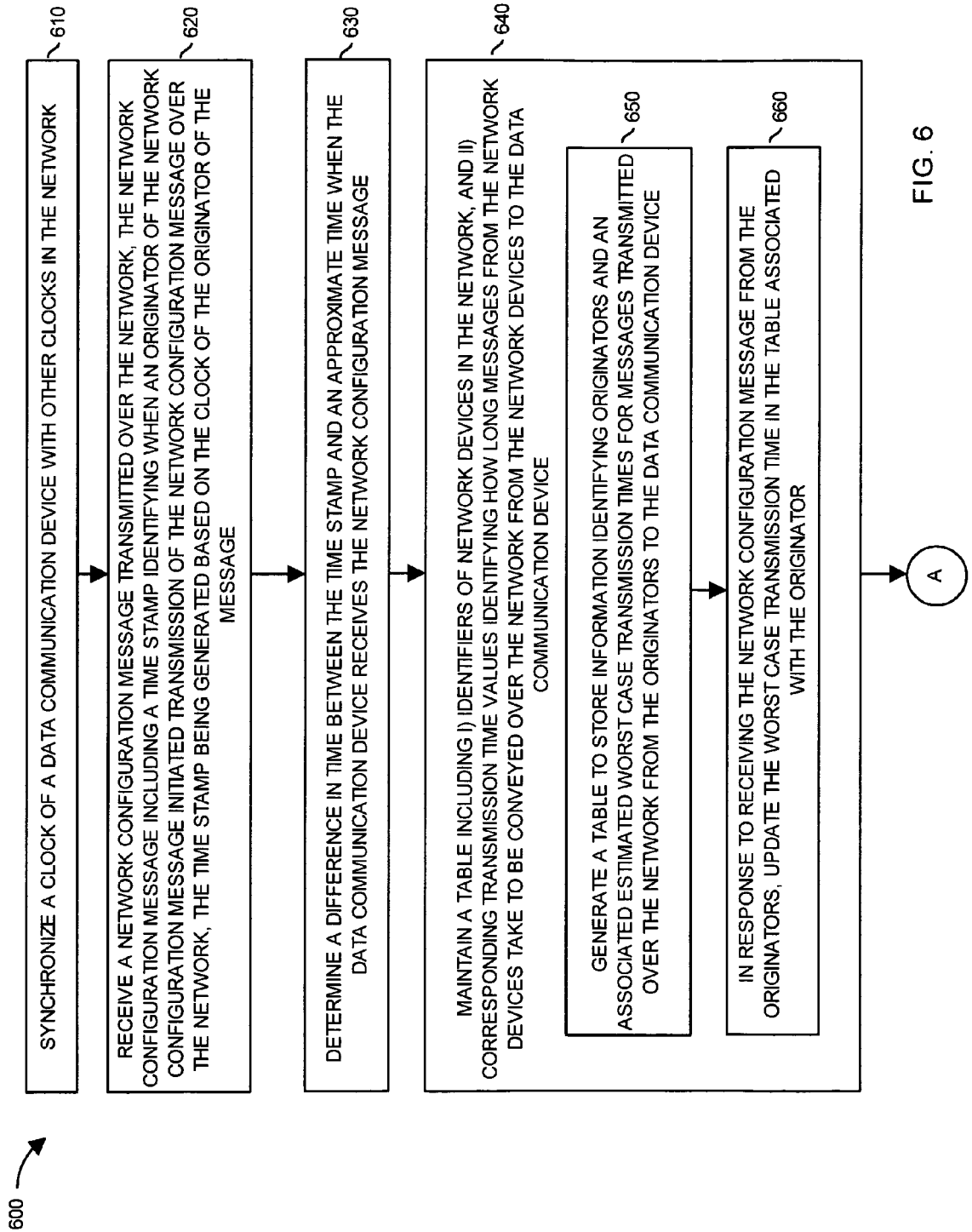
FIGS. 6 and 7 combine to form a flowchart illustrating a technique of tracking transit times of messages for determining a communication timeout value within which a target network node should respond to an inquiry.
Figure 7:
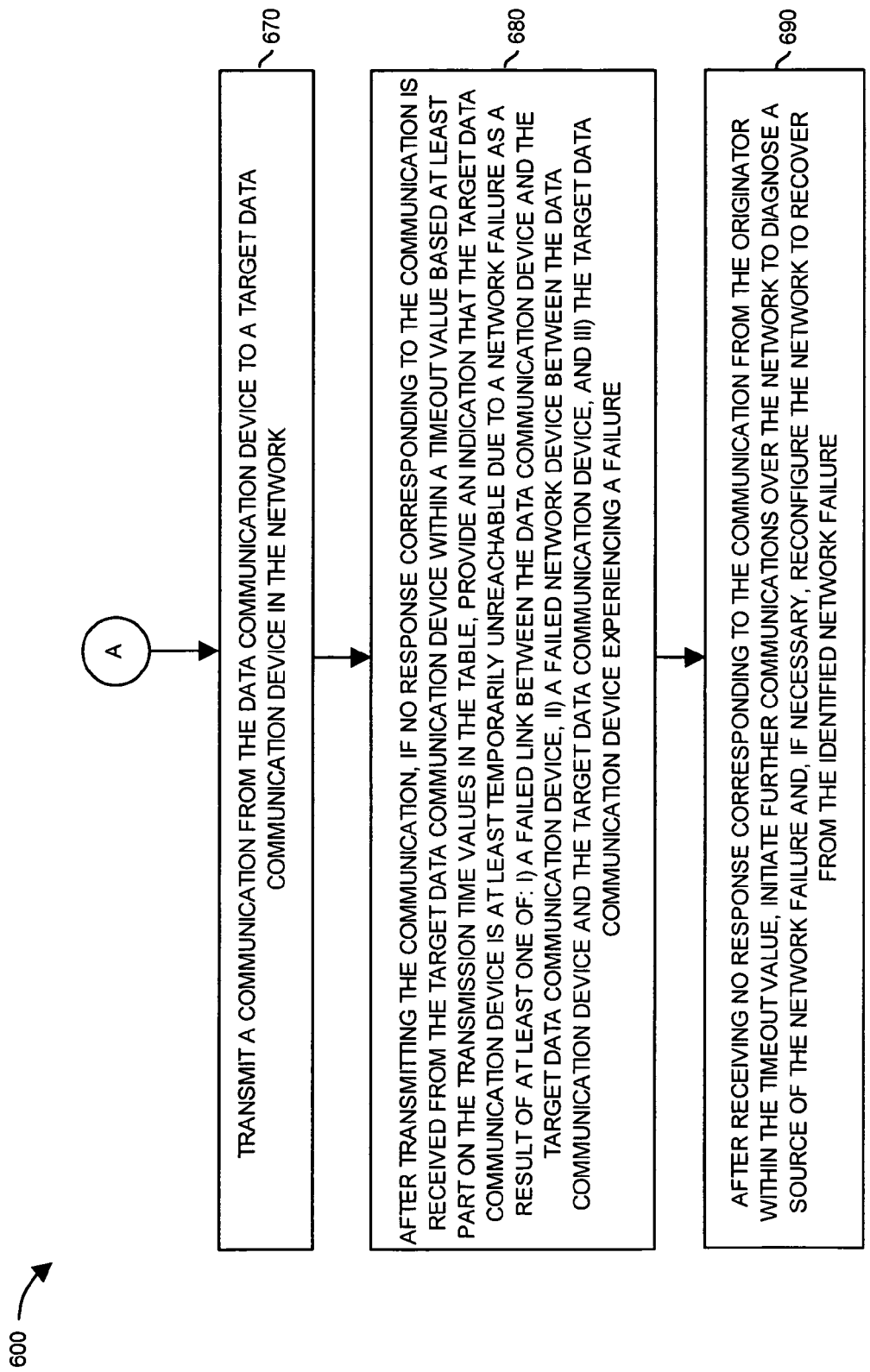

FIGS. 6 and 7 combine to form a flowchart 600 illustrating a technique of tracking transit times of messages through network 150. The transit times stored in tables 160 of data communication devices 110 can be used for determining a communication timeout value within which a target data communication device 110 (e.g., network node) should respond to an inquiry. For example, data communication device 110-1 can track how long it takes to receive messages from other data communication devices 110 over network 150 as discussed. Information in the table 160-1 serves as a basis for identifying timeout values during which a target such as data communication device 110-3 should respond to a message. Note that certain techniques illustrated by flowchart 600 have already been discussed with respect to the previous figures.

In step 610, data communication device 110-1 synchronizes its clock 135-1 with other clocks 135 in the network 150. Re-synchronizing may happen periodically or occasionally over time.

In step 620, data communication device 110-1 receives a network configuration message (e.g., an LSA message) transmitted and propagated over the network 150. The network configuration message from data communication device 110-3 includes a time stamp identifying when data communication device 110-3, originator of the network configuration message, initiated transmission of the network configuration message over the network 150.

In step 630, data communication device 110-1 determines a difference in time between the time stamp of the network configuration message and an approximate time when the data communication device 110-1 receives the network configuration message from data communication device 110-3.

In step 640, data communication device 110-1 maintains a table including i) identifiers of network devices (e.g., data communication devices) in the network 150, and ii) corresponding transmission time values identifying how long messages from all or a portion of the network devices take to be conveyed over the network 150 from the network devices to the data communication device 110-1.

In step 650, data communication device 110-1 generates a table 160-1 to store information identifying an originator of the network configuration message and an associated estimated worst-case transmission time for the network configuration message to be transmitted over the network from the originator to the data communication device 110-1. Data communication device 110-1 keeps track of this information for many other network devices.

In step 660, in response to receiving the network configuration messages from the originators, the data communication device 110-1 updates the worst-case transmission times in the table associated with the originators of network configuration messages. Consequently, the data communication device 110-1 constantly updates its information so that it remains current over time. However, note that not every LSA message needs to be encoded with a timestamp value. Nor does a receiving data communication device 110 need to process a received network configuration message to retrieve a timestamp.

In step 670, the data communication device 110-1 transmits a communication from the data communication device 101-1 to a target such as data communication device 110-3 in the network 150. For example, data communication device 110-1 attempts to communicate with data communication device 110-3. The communication may be merely an inquiry or a command such as a request to reconfigure the network 150.

In step 680, after transmitting the communication, if no LSA message is received from the target data communication device 110-3 within a timeout value based at least part on the transmission time values in the table 160-1, data communication device 110-1 flags that the target data communication device 110-3 may be at least temporarily unreachable due to a communication device failure. That is, if data communication device 110-1 does not receive any response from data communication device 110-3 within a timeout value based at least part on the transmission time values in the table 160-1, this means that the problem is not due to a network failure. Otherwise an LSA message reporting a topology change would have been received during this timeout interval.

In step 690, after receiving no response within the timeout value, the data communication device 110-1 or other entity in network 150 initiates further communications over the network 150 to diagnose a source of the device equipment failure.

In one application, a data communication device 110 is a computer system comprising: a processor; a memory unit that stores instructions associated with an application executed by the processor; and an interconnect coupling the processor and the memory unit, enabling the computer system to execute the application and perform the operations discussed herein.

Those skilled in the art should readily appreciate that the programs and methods for identifying network failure as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers, microprocessors, central processing units, logic devices, or other hardware components or devices, or a combination of hardware, software, and firmware components.

There are various circumstances where it is beneficial for a data communication device 110 such as a router to estimate a worst-case value of an IGP LSA message (e.g., a Fault Indication Signal or FIS), which is approximately equal to a maximum amount of time that elapses between origination of a new LSA/LSP message and receipt by receipt of the LSA/LSP message at the router as discussed in the above embodiments.

An example of the use of such a timeout value (e.g., at least partially based on worst-case transit times discussed above) and its applicability to use in networks environments is illustrated in related U.S. patent application Ser. No. 11/001,149, entitled "SYSTEM AND METHODS FOR DETECTING NETWORK FAILURE," filed on Dec. 1, 2004, the entire teachings of which are incorporated herein by this reference.

Indeed, one of the objectives of a PE-router in such a context is to determine a root cause of a data forwarding failure which may occur when a path to a PE-router is not operational, the requesting PE-router does not have any way to determine whether the remote PE "under investigation" is down or isolated, or whether such PE-router has itself failed. Note that the current strategy used in the above referenced application is a static configuration of timer or timeout value T. In contradistinction, a proposed technique as discussed herein includes waiting a period T (e.g., a timeout value derive from the LSA message transit times) before trying to reach a non-responding target PE-router. In the context of such an application, communication timeout T is the evaluated maximum amount of time for the receipt of an LSA message. If a target PE router is still unreachable, this is probably not due to a transient state due to in-progress IGP convergence, but instead because the remote PE is either isolated or has failed. In this latter case, an ingress PE-router would trigger appropriate set of actions due to such non-responsiveness. Such courses of action are discussed in the above co-pending patent application.

Certain embodiments discussed herein rely on the monitoring and processing of time stamped LSA/LSP packets by routers synchronized with the NTP (Network Time Protocol v3-RFC1305) protocol. Following synchronization via the NTP protocol, each router in a network originates stamped LSA/LSP at regular configurable intervals. In the case of OSPF, timestamps can be conveyed within a new Opaque LSA type 11 (domain scope) whereas a new TLV is defined for IS-IS which contains the timestamp and is carried within the IS-IS LSP. Note that in this case, such TLV must be leaked across multiple IS-IS levels. An implementation of the invention may employ use of configurable timers both for OSPF and IS-IS. In the later case, a node will originate an LSP containing the stamp TLV. Upon the expiration of such a timer, the LSP must be originated either due to an LSP refresh or due to a topology state change.

Note that other parameters, in addition to timestamps, may be further added in the form of additional sub-TLVs included within the new TLV proposed by this invention. Note also that the presence of such new timestamp sub-TLV must not trigger any additional SPF.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a data communications device, a method for tracking a relative ability to transmit messages over a network, the method comprising:
   receiving a network configuration message transmitted over the network;
   processing the network configuration message to identify when an originator of the network configuration message initiated transmission of the network configuration message over the network;
   based on when the originator initiated transmission of the network configuration message, calculating a transmission time value measuring how long the network configuration message takes to be conveyed over the network from the originator to the data communication device; and
   utilizing the transmission time value to estimate a timeout value in turn used by the data communication device to determine an occurrence of a communication failure.

2. A method as in claim 1 further comprising:
   wherein processing the network configuration message includes parsing the network configuration message received from the originator to retrieve a time stamp identifying when the originator of the network configuration message initiated transmission of the network configuration message over the network, the time stamp being generated based on the clock of the originator; and
   wherein calculating the transmission time value includes determining a difference in time between the time stamp and an approximate time when the data communication device receives the network configuration message.

3. A method as in claim 2, wherein parsing the network configuration message received from the originator includes:
   retrieving an encoded binary value stored in the network configuration message, the network configuration message being a link state advertisement message including a state information of router interfaces associated with the originator as well as a state information of neighboring routers of the originator.

4. A method as in claim 1, wherein utilizing the transmission time value includes:
   transmitting a communication from the data communication device to the originator; and
   after transmitting the communication, if no response is received from the originator within a timeout value based at least part on the transmission time value, providing an indication that the originator is at least temporarily unreachable due to a data communication device failure.

5. A method as in claim 4 further comprising:
   after receiving no response corresponding to the communication from the originator within the timeout value, initiating further communications over the network to diagnose a source of the data communication failure and, if necessary, reconfigure the network to recover from the failure.

6. A method as in claim 1, wherein the network configuration message generated by the originator is copied and broadcasted through the network to other network devices that keep track of how long the network configuration message takes to propagate through the network.

7. A method as in claim 1 further comprising:
   generating a table to store information identifying the originator and an associated estimated worst case transmission time for messages transmitted over the network from the originator to the data communication device; and
   in response to receiving the network configuration message from the originator, updating the worst case transmission time in the table associated with the originator.

8. A method as in claim 7 further comprising:
   identifying that the transmission time value for the network message is substantially different than transmission time values of previous messages from the originator to the data communication device; and
   filtering the transmission time value by not updating the worst case transmission time in the table for the originator.

9. A method as in claim 7 further comprising:
in lieu of storing an entry in the table for each of multiple network devices including the originator, maintaining a single worst case transmission time value for a group of network devices.

10. A method as in claim 1 further comprising:
maintaining a table including i) identifiers of network devices in the network, and ii) corresponding transmission time values identifying how long messages from the network devices take to be conveyed over the network from the network devices to the data communication device.

11. In a network device, a method to support tracking of a relative ability to transmit messages over a network, the method comprising:
originating a network configuration message;
providing a time value in the network configuration message, the time value indicating a time of originating the network configuration message;
transmitting the network configuration message over the network to other network devices that, in turn, initiate broadcasting at least a portion of contents of the network configuration message to yet other network devices to advertise a network topology change; and
via the network configuration message, flooding the network with an advertisement of the network topology change as well as providing a time reference value for the other network devices to measure transmission time values indicating how long the network configuration message takes to be conveyed over the network to the other network devices, the other network devices configured to utilize the transmission time values for determining whether a data communication device failure occurs in the network.

12. A method as in claim 11 further comprising:
at a network device receiving the network configuration message, utilizing a given time value to determine a transit time associated with transmitting the network configuration message through the network.

13. A method as in claim 11, wherein providing the time value in the network configuration message includes providing a time stamp in an LSA/LSP (Link State Advertisement/Label Switched Path) message.

14. A computer system for tracking a relative ability to transmit messages over a network, the computer system comprising:
a processor;
a memory unit that stores instructions associated with an application executed by the processor; and
an interconnect coupling the processor and the memory unit, enabling the computer system to execute the application and perform operations of:
receiving a network configuration message transmitted over the network;
processing the network configuration message to identify when an originator of the network configuration message initiated transmission of the network configuration message over the network;
based on when the originator initiated transmission of the network configuration message, calculating a transmission time value measuring how long the network configuration message takes to be conveyed over the network from the originator to the data communication device; and
utilizing the transmission time value to estimate a response time during which the originator should respond to a communication from the data communication device before declaring an occurrence of a data communication device failure.

15. A computer system as in claim 14 that additionally performs operations of:
wherein processing the network configuration message includes parsing the network configuration message received from the originator to retrieve a time stamp identifying when the originator of the network configuration message initiated transmission of the network configuration message over the network, the time stamp being generated based on the clock of the originator; and
wherein calculating the transmission time value includes determining a difference in time between the time stamp and an approximate time when the data communication device receives the network configuration message.

16. A computer system as in claim 15, wherein parsing the network configuration message received from the originator includes:
retrieving an encoded binary value stored in the network configuration message, the network configuration message being a link state advertisement message including a state information of router interfaces associated with the originator as well as a state information of neighboring routers of the originator.

17. A computer system as in claim 14, wherein utilizing the transmission time value includes:
transmitting the communication from the data communication device to the originator; and
after transmitting the communication, if no response corresponding to the communication is received from the originator within a timeout value based at least part on the transmission time value, providing an indication that the originator is at least temporarily unreachable due to a data communication device failure.

18. A computer system as in claim 17 that additionally performs operations of:
after receiving no response corresponding to the communication from the originator within the timeout value, initiating further communications over the network to diagnose a source of the data communication device failure and, if necessary, reconfigure the network to recover from the data communication device failure.

19. A computer system as in claim 14, wherein the network configuration message generated by the originator is copied and broadcasted through the network to other network devices that keep track of how long the network configuration message takes to propagate through the network.

20. A computer system as in claim 14 that additionally performs operations of:
generating a table to store information identifying the originator and an associated estimated worst case transmission time for messages transmitted over the network from the originator to the data communication device; and
in response to receiving the network configuration message from the originator, updating the worst case transmission time in the table associated with the originator.

21. A computer system as in claim 20 that additionally performs operations of:
identifying that the transmission time value for the network message is substantially different than transmission time values of previous messages from the originator to the data communication device; and
filtering the transmission time value by not updating the worst case transmission time in the table for the originator.

22. A computer system as in claim 20 that additionally performs operations of:
  in lieu of storing an entry in the table for each of multiple network devices including the originator, maintaining a single worst case transmission time value for a group of network devices.

23. A computer system as in claim 14 that additionally performs operations of:
  maintaining a table including i) identifiers of network devices in the network, and ii) corresponding transmission time values identifying how long messages from the network devices take to be conveyed over the network from the network devices to the data communication device.

24. A computer system for tracking a relative ability to transmit messages over a network, the computer system comprising:
  a processor;
  a memory unit that stores instructions associated with an application executed by the processor; and
  an interconnect coupling the processor and the memory unit, enabling the computer system to execute the application and perform operations of:
    originating a network configuration message in response to a network topology change;
    providing a time value in the network configuration message, the time value indicating a time of originating the network configuration message;
    transmitting the network configuration message over the network to other network devices that, in turn, initiate broadcasting at least a portion of contents of the network configuration message to yet other network devices to advertise the network topology change;
    wherein providing the time value in the network configuration message includes providing a time stamp in an LSA/LSP (Link State Advertisement/Label Switched Path) message; and
    via the network configuration message, flooding the network with an advertisement of the network topology change or a message refresh as well as providing a time reference value for the other network devices to measure transmission time values indicating how long the network configuration message takes to be conveyed over the network to the other network devices, the other network devices configured to utilize the transmission time values as a timeout period for determining whether a communication failure occurs.

25. A computer system for tracking an ability to convey messages over a network, the computer system including:
  means for receiving a network configuration message transmitted over the network;
  means for processing the network configuration message to identify when an originator of the network configuration message initiated transmission of the network configuration message over the network;
  means for calculating, based on when the originator initiated transmission of the network configuration message, a transmission time value measuring how long the network configuration message takes to be conveyed over the network from the originator to the data communication device; and
  means for utilizing the transmission time value to estimate a response time during which the originator should respond to a communication from the data communication device before declaring an occurrence of a data communication device failure.

26. A computer system for tracking an ability to convey messages over a network, the computer system including:
  means for originating a network configuration message in response to a network topology change;
  means for providing a time value in the network configuration message, the time value indicating a time of originating the network configuration message;
  means for transmitting the network configuration message over the network to other network devices that, in turn, initiate broadcasting at least a portion of contents of the network configuration message to yet other network devices to advertise the network topology change or convey a refresh configuration message; and
  means for flooding the network with an advertisement of the network topology change as well as means for providing a time reference value for the other network devices to measure transmission time values indicating how long the network configuration message takes to be conveyed over the network to the other network devices, the other network devices utilizing the transmission time value as a timeout period for determining whether a data communication device failure occurs in the network.

* * * * *